United States Patent [19]
Hosotani

[11] Patent Number: 4,703,819
[45] Date of Patent: Nov. 3, 1987

[54] FULL HYDRAULIC POWER STEERING SYSTEM

[75] Inventor: Takashi Hosotani, Kawasaki, Japan

[73] Assignee: Nissan Motor Co., Ltd., Yokohama, Japan

[21] Appl. No.: 802,422

[22] Filed: Nov. 27, 1985

[30] Foreign Application Priority Data

Feb. 27, 1985 [JP] Japan .................................. 60-40118
Mar. 8, 1985 [JP] Japan .................................. 60-45777
May 13, 1985 [JP] Japan .................................. 60-101065

[51] Int. Cl.⁴ .......................................... B62D 5/06
[52] U.S. Cl. ..................................... 180/132; 60/468;
91/399; 91/459; 180/142
[58] Field of Search ............... 180/132, 140, 141, 142;
60/468; 91/406, 407, 399, 437, 459, 465

[56] References Cited
U.S. PATENT DOCUMENTS 3,202,238 8/1965 Strader ................................ 180/140
3,933,215 1/1976 Scheuerle ....................... 180/140 X
3,958,420 5/1976 Yokota ................................ 60/453
4,359,127 11/1982 Arnold ................................ 180/132

FOREIGN PATENT DOCUMENTS 0060147 9/1982 European Pat. Off. ..
983999 2/1965 United Kingdom .
1477566 6/1977 United Kingdom .
2063192 6/1981 United Kingdom .

OTHER PUBLICATIONS

Kunogi, Kazuhiko, Hosotani, Takashi, Iguchi, Toshikazu, Ogawa, Ryoji, "The Development of a New 1-Ton Three-Wheel Electrio Forklift Truck", *Nissan Technical Review No. 19*, published by Nissan Motor Co., Ltd., Dec. 1983, pp. 165-177.

Primary Examiner—John A. Pekar
Attorney, Agent, or Firm—Schwartz, Jeffery, Schwaab, Mack, Blumenthal & Evans

[57] ABSTRACT

A full hydraulic power steering system for a forklift truck is disclosed wherein in order to correct the position of a steering wheel in relation to an actuator for a steered wheel, hydraulic fluid is discharged from a portion of hydraulic fluid line means interconnecting a steering unit operable by the steering wheel and the actuator.

18 Claims, 20 Drawing Figures

FULL HYDRAULIC POWER STEERING SYSTEM

BACKGROUND OF THE INVENTION

The present invention relates to a full hydraulic power steering system for use in a motor vehicle, such as a forklift truck, which does not require a steering gear or a mechanical linkage.

Full hydraulic power steering systems are well known. For example, a system as shown in FIG. 1 is known. This system is disclosed by Nissan Technical Review No. 19, published by Nissan Motor Co., Ltd. in December, 1983 (see pages 170 and 171)

Referring to FIG. 1, this known system comprises a steering unit 102 (a valve) operated by a steering wheel 101 with a spoke 112, a steering servo actuator 104 (an actuator), a hydraulic fluid line 105 leading from the steering unit 102 to the steering servo 104, a hydraulic fluid line 106 leading from the steering unit 102 to the steering servo 104, a hydraulic fluid tank 108, and a hydraulic fluid pump 107. The pump 107 supplies hydraulic fluid to the steering unit 102. The steering unit 102 distributes the supply of hydraulic fluid from the pump 107 to the hydraulic fluid lines 105 and 106, selectively. This system is installed in a three-wheel forklift 109 which has a rear steered wheel 103 and a pair of front unsteered wheels 111. The steering servo 104 includes a pair of hollow rods 141 having their outer ends fixedly mounted on the vehicle body 109 and inner ends separated by a piston slidably received in a cylinder 142. The cylinder 142 is slidably along the rods 141 and has opposite ends through which the rods 142 extends out of the cylinder 142. The rods 141 are hollowed to establish hydraulic fluid passages connecting the hydraulic fluid lines 105 and 106 to portion inside the cylinder 142 divided by the piston. The cylinder 142 is dirvingly connected to the steered wheel 103 by a chain drive 110. In FIG. 1, small arrows along the hydraulic fluid lines 105 and 106 denote fluid flows through the hydraulic fluid lines when the steering wheel 101 is turned counter clockwise to turn the vehicle 109 to the left by steering the steered wheel 103 to the right. When the steering wheel 101 is turned to the left in order to steer the vehicle to the left, this movement of the steering wheel 101 causes the steering unit 102 to supply hydraulic fluid to the steering servo 104 in an amount that is in proportion to the steering wheel angle along a direction indicated by the small arrows. The hydraulic fluid supplied to the steering servo 104 flows through the hollow of one of the rods 144 into the inside of the cylinder 142. Since the rods 141 are fixed to the vehicle body 109, the cylinder 142 moves in accordance with the total amount of hydraulic fluid supplied, turning the steered wheel 103 via the chain 110 through an angle (a steered angle) that corresponds to the steering angle of the steering wheel 101.

In the conventional full hydraulic power steering system, however, since the steering unit 102 and the steering servo 104 are interconnected with the hydraulic fluid lines 105 and 106, only, and a steering gear or a mechanical linkage are not used, the amount of hydraulic fluid supplied to the steering servo 104 does not correspond to the steering wheel angle through which the steering wheel 101 is turned thereby to cause a difference therebetween if oil leaks within the steering unit 102. This causes a change in the relationship of the directional position assumed by the spoke 112 with that assumed by the steered wheel 103.

This is particularly a problem in the case where the steering wheel stays in a directional position slightly different from the neutral position even though the steered wheel is oriented in the straight neutral position. That is, the forklift travels straight forward against the intention of an operator if he relies only on the directional position of the spoke 112 on turning vehicle in the direction indicated by the position of the spoke 112.

The present invention aims at solving the above mentioned problem.

SUMMARY OF THE INVENTION

According to the present invention, there is provided a full hydraulic power steering system for a vehicle having a steered wheel, comprising:

a hydraulic actuator including a stationary part fixed to the vehicle and a movable part movable relative to said stationary part drivinly connected to the steered wheel;

a steering wheel;

a steering unit operable by said steering wheel;

hydraulic fluid line means operatively interconnecting said steering unit and said hydraulic actuator;

means connected to a portion of said hydraulic fluid line means for passing hydraulic fluid flow therethrough in one direction from said portion to cause a drop in hydraulic fluid;

valve means fluidly disposed in said hydraulic fluid flow passing means for normally blocking said hydraulic fluid flow, said valve being being operable for allowing said hydraulic fluid flow to pass through said hydrauilic fluid flow passing means; and means for operating said valve means.

DESCRIPTION OF THE EMBODIMENTS

Figure 1:
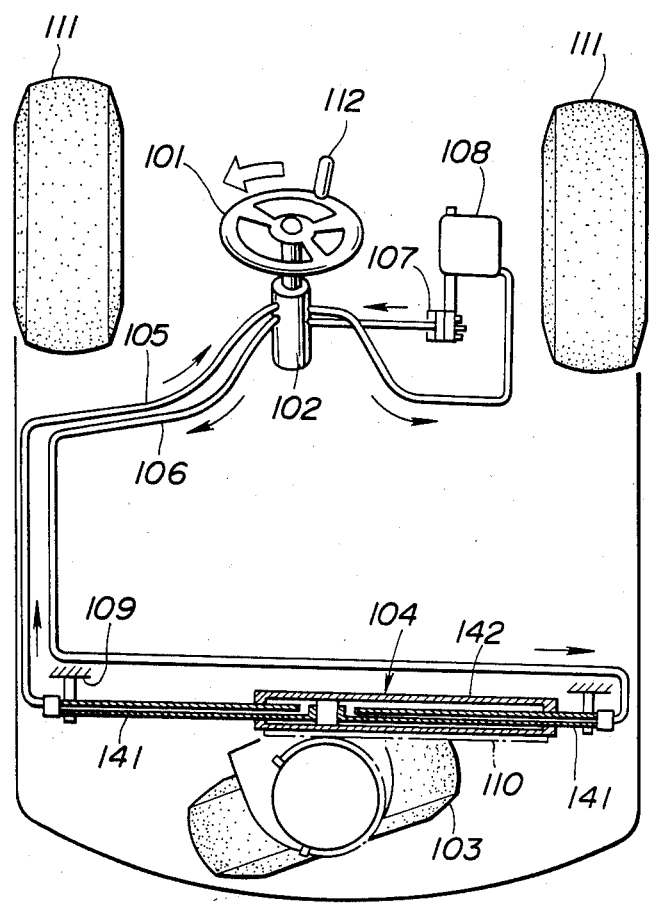
FIG. 1 is a diagram of a three-wheel forlift truck installed with a conventional full hydraulic power steering system discussed before.
Figure 2:
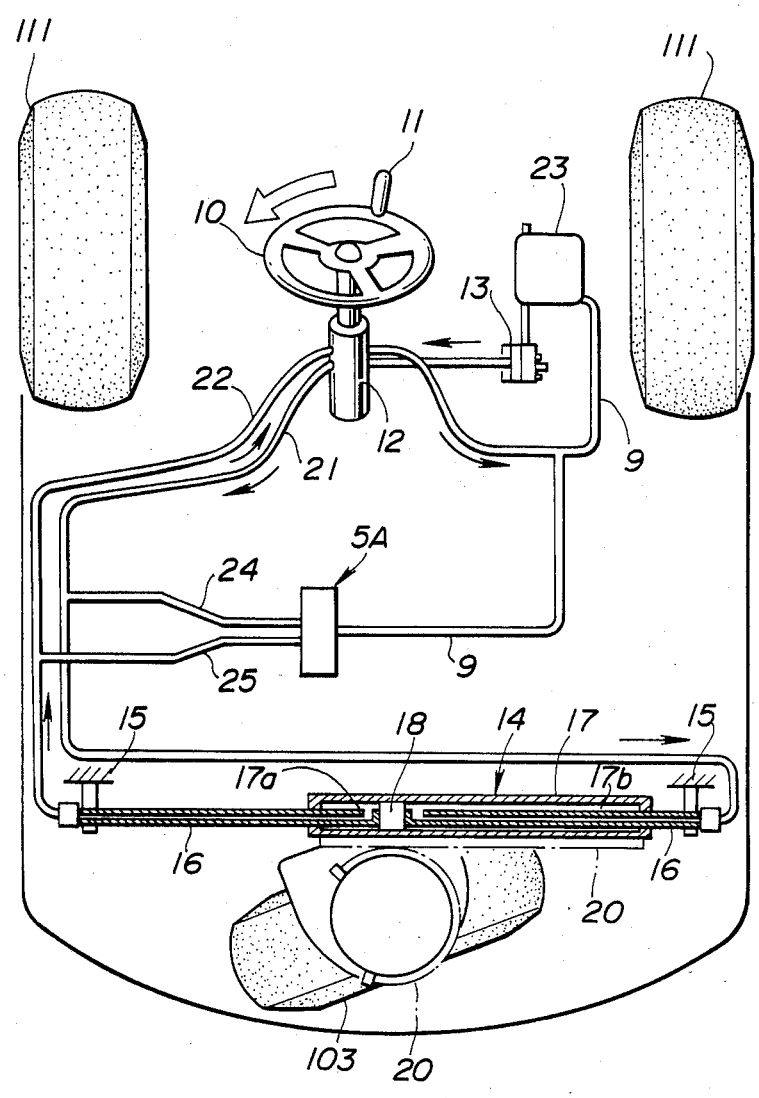
FIG. 2 is a diagram of a three-wheel forklift truck installed with an embodiment of a full hydraulic power steering system according to the present invention.
Figure 3:
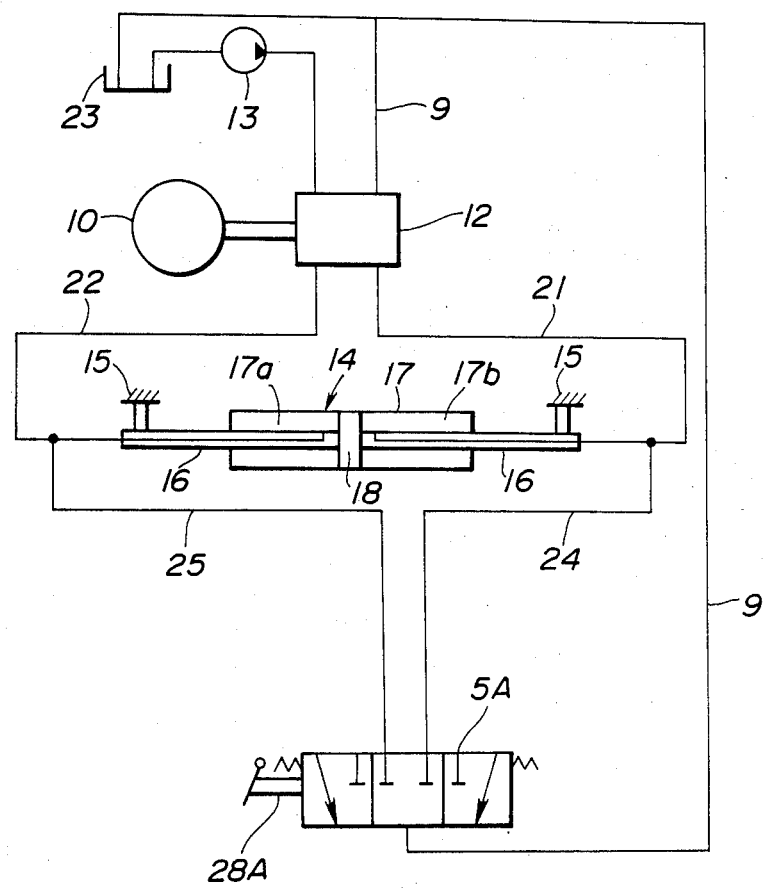
FIG. 3 is a hydraulic circuit diagram of the system shown in FIG. 2.

Referring to the accompanying drawings, and particularly to FIGS. 2 and 3, an embodiment of a full hydraulic power steering system as being installed in a three-wheel forklift truck is described.

As shown in FIG. 2, the three-wheel forklift truck comprises a vehicle body 15, a pair of unsteered front wheels 111, 111 and a steered rear wheel 103. Referring also to FIG. 3, the full hydraulic power steering system comprises a steering wheel 10 with a spoke 11, and a steering unit 12 that is directly operable by the steering wheel 10. This steering unit 12 has a control valve of the type having reaction chambers, not shown, and is designed to regulate hydraulic fluid under pressure supplied by a steering pump 13 and supplies an amount of hydraulic fluid to a steering cylinder 14 which will be later described, the amount of hydraulic fluid supplied by the steering unit 12 being in proportion to a steering wheel angle, i.e., an angle through which the steering wheel is turned. When the steering wheel 10 is in the neutral position thereof, all of the hydraulic fluid supplied to the steering unit 12 by the pump 13 returns through the drain line 9 to the tank 23.

The steering cylinder 14 serves as a hydraulic actuator for the steered wheel 103. It comprises a pair of rods 16, 16 having their outer ends fixed to two spaced portions of a vehicle body diagrammatically illustrated and designated by the reference numeral 15. The rods 16, 16 extend into a cylinder 17 from axial ends of the latter and have their inner ends fixed to a piston 18 disposed in a bore of the cylinder 17. The piston 18 divides the bore of the cylinder 17 into two chambers 17a and 17b. The cylinder 17 is closed at their axial ends and slidable relative to the rods 16, 16 and the piston 18 in a direction in which the rods 16, 16 extend.

The cylinder 17 is connected with the steered wheel 103 by a steering chain drive 12 such that movement of the cylinder 17 causes the steered wheel to change its direction.

The outer ends of the rods 16, 16 are connected to the steering unit 12 by hydraulic fluid lines 21 and 22, respectively. If the steering wheel 10 is turned from the neutral position thereof, hydraulic fluid is supplied to the cylinder 17 via one of the hydraulic fluid lines and hydraulic fluid is discharged from the cylinder 17 to be returned to a hydraulic fluid tank 23 via a drain line 9. The rods 16, 16 are hollowed to establish fluid communication between the chambers 17a and 17b within the cylinder 17 and the hydraulic fluid lines 22 and 21, respectively. FIG. 2 shows the position of parts and direction of hydraulic fluid during a transient period when the steering wheel 10 is turned counterclockwise in order to steer the vehicle to the left. In this case, the hydraulic fluid line 21 serves as a hydraulic fluid supply line, while the other hydraulic fluid line 22 serves as a hydraulic fluid discharge line, thus allowing hydraulic fluid to flow into the chamber 17b, but discharging hydraulic fluid from the other chamber 17a. This causes movement of the cylinder 17 from the neutral position thereof to the right as viewed in FIG. 2, thus steering the wheel 103 to a position illustrated in FIG. 2 through the steering chain drive 20.

For draining the hydraulic fluid lines 21 and 22, selectively, there are provided a change-over valve 5A and drain lines 24 and 25 have one ends connected to the hydraulic fluid lines 21 and 22, respectively, and opposite ends connected to the change-over valve 5A. As will be readily understood from FIG. 3, a manually operable control member 28A is provided to shift the change-over valve 5A from a neutral position wherein both of the drain lines 24 and 25 are disconnected from the drain line 9 communicating with the tank 23 to a first position wherein the drain line 24 is connected to the drain line 9 even though the drain line 25 remains disconnected from the latter or to a second position where the drain line 25 is connected to the drain line 9 even though the other drain line 24 remains disconnected from the latter.

The operation of the embodiment described above is now explained.

On steering the vehicle, an operator turns the steering wheel 10 through an angle toward a direction in which the vehicle is to be steered. Turning the steering wheel 10 causes the steering unit 12 to supply an amount of hydraulic fluid proportional to the angle through which the steering wheel is turned, i.e., the steering wheel angle, to the steering cylinder 14 via one of the hydraulic fluid lines 21 and 22 and discharging hydraulic fluid from the steering cylinder 14 through the other hydraulic fluid line, thus causing the steered wheel 103 to change is direction through an angle, i.e., a steered angle, which corresponds to the steering wheel angle.

Consider a case where the steering wheel 10 does not assume the straight forward neutral position even though the steered wheel 103 is directed in the straight forward neutral position because of the occurrence of leak of hydraulic fluid within the steering unit 12. In this case, the change-over valve 5A is shifted manually to one of the first and second positions to drain one of the hydraulic fluid lines 21 and 22, thus rendering the steering wheel 10 to be free to turn without moving the steering cylinder 14 from its straight forward neutral position. Then, the steering wheel 10 is manually turned to the straight forward neutral position thereof. After this operation, the change-over valve 5A is shifted back to the neutral position where both of the drain lines 24 and 25 are disconnected from the drain line 9. In this manner, the straight forward neutral position of the steering wheel 10 is brought into agreement with the straight forward neutral position of the steered wheel 103. The steering wheel 10 is rendered to be free to turn when the reaction chambers are drained by draining the hydraulic fluid lines in the manner discussed above.

Figure 4:
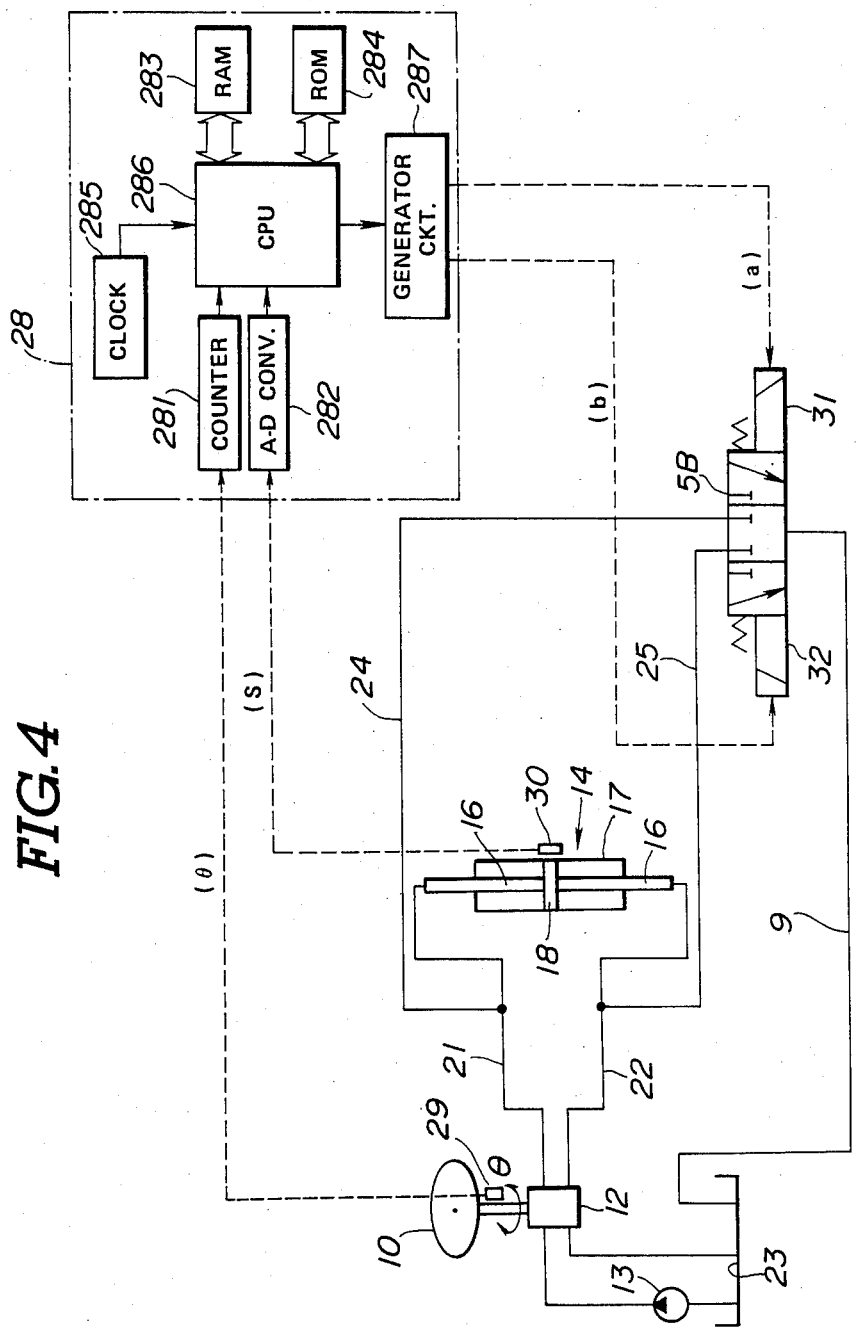
FIG. 4 is a hydraulic circuit diagram of another embodiment of a full hydraulic power steering system in operative cooperation with a control unit.
Figure 5:
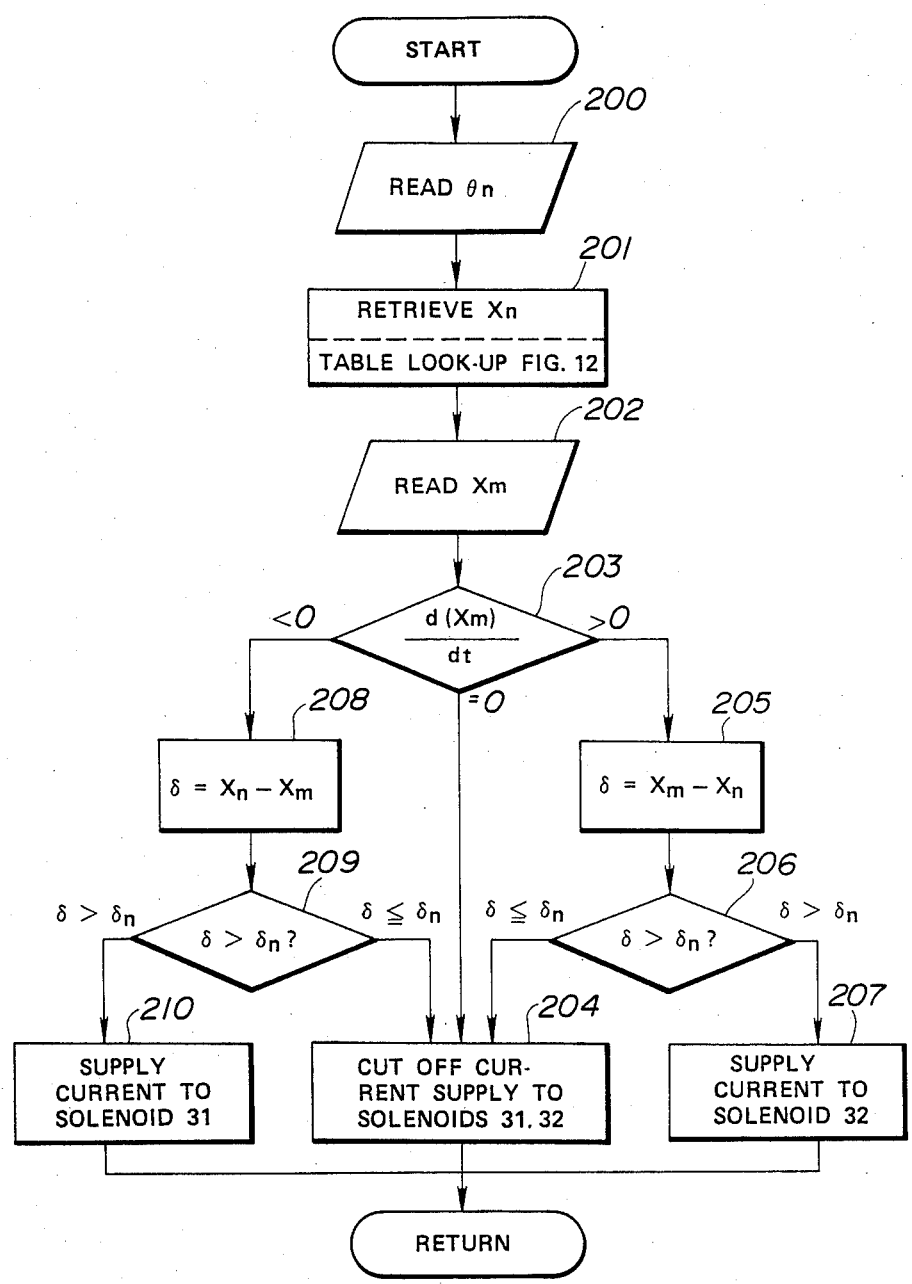
FIG. 5 is a flow chart showing a sequence of operations carried out in the control unit shown in FIG. 4.

Referring next to FIGS. 4 and 5, another embodiment is described. This embodiment is designed to execute a correction in rotary position of a steering wheel 10 whichever position a steered wheel 103 may assume even though the embodiment illustrated in FIGS. 2 and 3 cannot execute such correction except when the steered wheel 103 assumes the straight forward neutral position thereof.

Referring to FIG. 4, this embodiment illustrated is similar to the embodiment illustrated in FIGS. 2 and 3 so that like reference numerals are used to designate like parts in these Figures.

In FIG. 4, reference numeral 29 designates a steering wheel angle sensor that detects a steering wheel angle assumed by a steering wheel 10 and generates an angle signal $\theta$ (theta) indicative of the steering wheel angle detected. Reference numeral 30 designates a cylinder position sensor that detects a stroke of a cylinder 17 and generates a stroke signal s indicative of the stroke detected. Since a steered angle of a steered wheel 103 varies as the stroke of the cylinder 17 does, detecting the stroke of the cylinder 17 may be regarded as indirectly detecting the steered angle of the steered wheel 103. As different from the embodiment illustrated in FIGS. 2 and 3 wherein the manual change-over valve 5A is used, an electromagnetic change-over valve 5B with two solenoids 31 and 32 is used. This change-over valve 5B shifts from the neutral position to one of two operative positions in response to energization of one of the solenoid 31 and 32, while it shifts to the other operative position in response energization of one of the solenoid 31 and 32, while it shifts to the other operative position in response energization of the other of the solenoids 31 and 32.

The angle signal $\theta$ (theta) and stroke signal S are supplied, as input signals, to a control unit 28, and output signals a and b are generated by the control unit 28 for controlling current passing through the solenoids 31 and 32 for the electromagnetic change-over valve 5B.

The control unit 28 includes a counter 281, an A-D converter 282, a RAM 283, a ROM 284, a clock 285, a CPU 286, and a generator circuit 287 for generating a position correction signal.

The counter 281 is a circuit designed to count the number of pulses of the angle signal $\theta$ (theta) supplied thereto in terms of a pulse train and converts the result into a digital signal that is suitable for processing in the CPU 286. The A-D converter is a circuit designed to convert the stroke signal s supplied thereto in terms of an analog current signal generated by the cylinder position sensor 30 employing a variable resistor into a digital signal that is suitable for processing in the CPU 286.

The RAM 283 is a memory designed to temporatily store the angle signal $\theta$ (theta) and stroke signal s in the form of digital signals, respectively. The ROM 284 stores a data table including a target value $X_n$ in cylinder stroke versus each value in steering angle $\theta$ (theta). The setting is such that the target value in cylinder stroke for a value in steering wheel angle is smaller than the actual value in cylinder stroke for the value in steering wheel angle. In this embodiment, the steering wheel angle $\theta$ (theta), the target value $X_n$ in cylinder stroke and the actual value $X_m$ in cylinder stroke take zero when the steering wheel 10 is turned to its leftmost position and take positive values as the steering wheel turns to the right.

Referring to the flow chart shown in FIG. 5, a series of operations executed by the control unit 28 is hereinafter described.

First of all, a step 200 is executed to read the steering wheel angle $\theta$ (theta) indicative of the actual steering angle $\theta_n$ (theta n). A step 201 is executed to retrieve a target cylinder stroke $X_n$ for the actual steering wheel angle $\theta_n$ (theta n) obtained in the step 200 by a table look-up. A step 202 is executed to read an actual cylinder stroke signal indicative of an actual cylinder stroke $X_n$. Then, a step 203 is executed where a first derivative of the actual cylinder stroke $X_n$ with respect to time is obtained and the result is compared with 0 (zero) in order to determine whether a change in the actual cylinder stroke angle between the preceding run and the present run indicates that the steered wheel 103 has turned to the right, that the steered wheel 103 has turned to the left or that the steered wheel has not turned in any direction. The judgement of this kind may be made by using the steering wheel angle on (theta n) or the target cylinder stroke $X_n$. If the result of the first derivative is equal to 0 (zero), a step 204 is executed where the supply of current passing through the solenoids 31 and 32 is cut off. Consider now that the steered wheel 103 has turned to the right. In this case, the result of the first derivative is larger than 0 (zero) and thus a step 205 is executed where $X_m - X_n$ is calculated to obtain a result $\delta$ (delta). Then, a step 206 is executed to compare the result $\delta$ (delta) obtained in the step 205 with a predetermined error $\delta$ n (delta n). If $\delta$ (delta) is less than or equal to the predetermined error $\delta n$ (delta n), the step 204 is executed and the supply of current to the solenoids 31 and 32 are cut off. If the result $\delta$ (delta) obtained in the step 205 is greater than $\delta n$ (delta n), a step 207 is executed where current is supplied to the solenoid 32 to energize same. Under this condition, the current supply to the solenoid 31 is cut off. The energization of the solenoid 32 causes the change-over valve 5B to shift to the one operative position where a drain line 25 connected to a hydraulic fluid line 22 is allowed to be connected to the drain line 9 thereby to the hydraulic fluid line 22. When the steered wheel 103 is to turn to the right, the hydraulic fluid is supplied from the steering unit 12 to the steering cylinder 14 through the hydraulic fluid line 22, while the hydraulic fluid is dischanged from the steering cylinder 14 through the other hydraulic fluid line 21. The drain of the hydraulic fluid line 22, therefore, causes a rapid drop in the pressure within the reaction chamber within the steering unit connected to this hydraulic fluid line 22, thus allowing the steering wheel 10 to turn further to the right until the result $\delta$ (delta) obtained in the step 205 in the following run becomes less than or equal to the predetermined error $\delta n$ (delta n). In this manner, the position of the steering wheel 10 is corrected.

If the result of the first derivatiove obtained in the step 203 is less than 0 (zero), a step 208 is executed where $X_n - X_m$ is calculated to give a result $\delta$ (delta). A step 209 is executed where the result $\delta$ (delta) obtained in the step 208 is compared with the above mentioned predetermined error $\delta n$ (delta n). If $\delta$ (delta) is less than or equal to the predetermined value $\delta n$ (delta n), the step 204 is executed. If $\delta$ (delta) is greater than the predetermined error $\delta n$ (delta n), a step 210 is executed where the solenoid 31 is energized. The energization of the solenoid 31 causes the change-over valve 5B to shift to the other operating position where the drain line 24 connected to the hydraulic fluid line 21 is allowed to connect to the drain line 9 thereby to drain the hydraulic fluid line to cause a rapid drop in the reaction chamber connected to the hydraulic fluid line 21. As a result, the steering wheel 10 is allowed to be free to turn to the left. In this manner the correction of the position of the steering wheel 10 is made.

Figure 6:
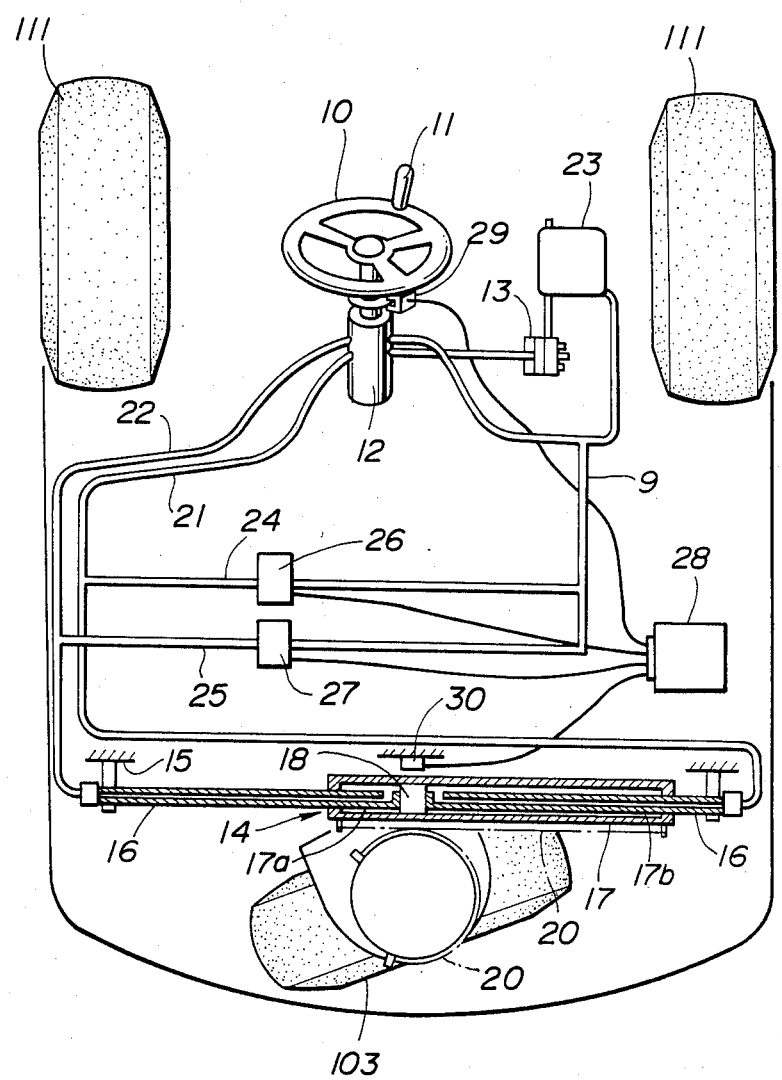
FIG. 6 is a diagram of a three-wheel forklift truck installed with another embodiment of a full hydraulic power steering system according to the present invention.
Figure 7:
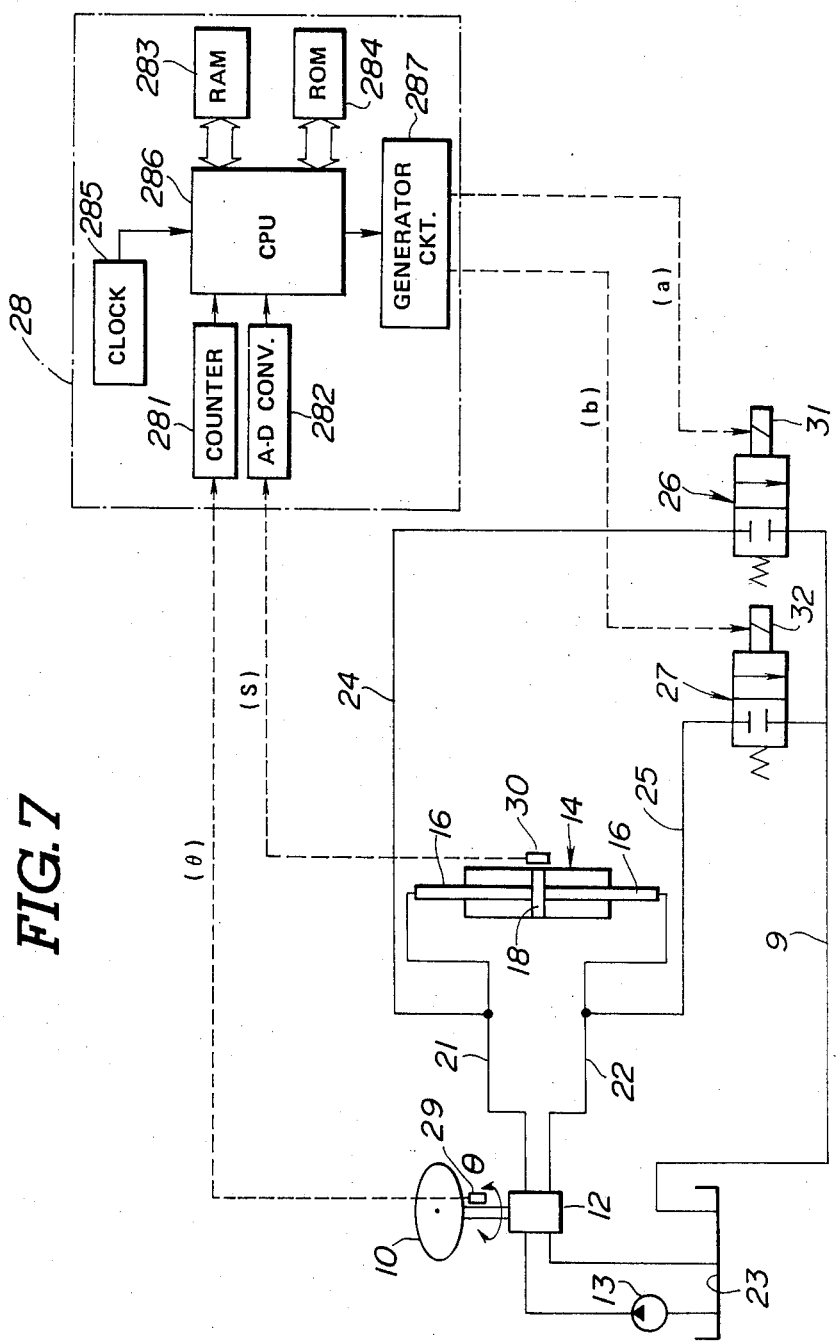
FIG. 7 is a hydraulic circuit diagram of the system shown in FIG. 6 is cooperation with a control unit.
Figure 12:
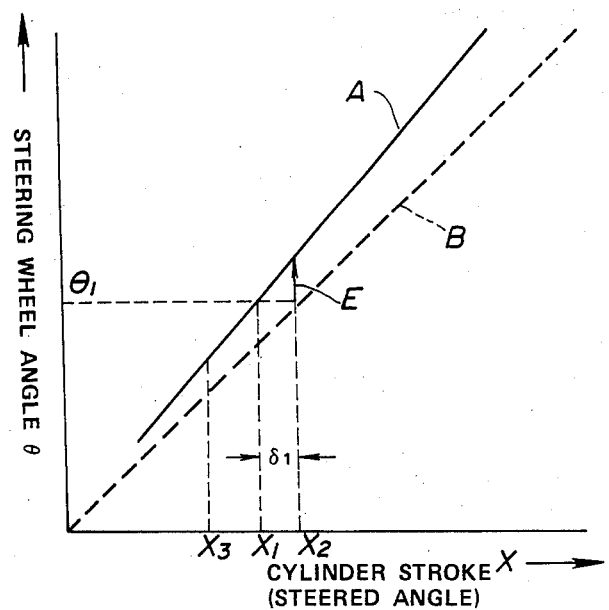
FIG. 12 is a graphical representation of a retrievable data table stored in the control unit.

Referring next to FIGS. 6, 7 and 12, another embodiment according to the present invention is described. Referring particularly to FIG. 7, a full hydraulic power steering system illustrated is substantially the same as that illustrated in FIG. 4 except that the single electromagnetic change-over valve 5B with the two solenoids 31 and 32 has been replaced with two electromagnetic valves 26 and 27 having solenoids 31 and 32, respectively. Each of the electromagnetic change-over valves 26 and 27 has a spring set position wherein a drain line 24 or 25 is disconnected from a drain line 9, and a solenoid biased position wherein the drain line 24 or 25 is connected to the drain line 9. The solenoid biased position is established when the associated solenoid 31 or 32 is energized upon receiving current supply. A control unit 28 is substantially the same as the control unit 28 illustrated in FIG. 4 in that both carries out operations as illustrated by the flow chart shown in FIG. 5.

Referring to FIG. 12, the operation of carried out by the control unit 28 is described in detail. A ROM 284 of the control unit 28 stores a table data containing target values in cylinder stroke X versus various values in steering wheel angle $\theta$ (theta) as shown by fully drawn line A in FIG. 12. As will be understood from comparison of the fully drawn line A with broken line B in FIG. 12, a ratio ($X/\theta$) on the fully drawn line A is smaller than the ratio on the broken line B that illustrates ideal target values. Referring also to FIG. 5, let us now assume that a value $\theta_1$ (theta one) is obtained as a steering wheel angle in a step 200, a value $X_1$ is obtained, in a step 201, for the value $\theta_1$ after look-up table as illustrated by the fully drawn line A in FIG. 12, as a target value in steering cylinder stroke, and a value $X_2$ is obtained, in a step 202, as an actual value in steering cylinder stroke. Let us also assume that the result of the first derivative (step 203) is greater than 0 (zero), and thus $X_2-X_1$ is calculated in a step 205 to give a result $\delta_1$ (delta one). If, now, this result $\delta_1$ is greater than a predetermined error $\delta n$ (delta n) in a step 206, a steering wheel 10 is allowed to be free to turn by an amount as indicated by E in FIG. 12 in a direction to increase the steering wheel angle.

Let us now assume that a value $X_3$ is obtained in the step 202 as an actual value in cylinder stroke, no correction in steering wheel angle is made because the result of calculation effected in the step 205, i.e., $X_3-X_1$, is a minus value and thus the step 204 is executed after the step 206.

Since $\delta = Xm - Xn$ is calculated in the step 205 while the steering wheel 10 is being turned in a direction to increase the steering wheel angle, while $\delta = Xn - Xm$ is calculated in the step 208 while the steering wheel 10 is turned in an opposite direction to decrease the steering wheel angle, a correction of the position of the steering wheel 10 is effected in a manner of allowing turning of the steering wheel 10 in the same direction in which the steering wheel 10 is being turned. This manner of correcting the position of the steering wheel 10 go well with an operator's feel on steering the vehicle.

Since the table data as shown in the fully drawn line A where the ratio (X/O) is smaller than the ratio established in the table containing the ideal target values as illustrated by the broken line B, the deviation $\delta$ (delta) as obtained in the step 205 or 208 exceeds the predetermined error, n;(delta n) more frequently than the case where the table data illustrated by the broken line B is used, and thus the correction of the position of the steering wheel 10 is made more frequently.

Referring to FIGS. 8, 9, 10, 11, another embodiment of a full hydraulic power steering system is described. This embodiment and its modifications as illustrated in FIGS. 13 to 17 embody various measures, respectively, to provide a safeguard against fluctuation in direction of a steered wheel 103 during operation of making a correction in the position of a steering wheel 10. That is, since there is a rapid drop in one of chambers 17a and 17b during making such correction, it is likely that a cylinder 17 cannot hold its position agains an external force applied to the steered wheel 103 to which the cylinder 17 is drivingly connected by a chain drive 20. Thus, this problem is solved by the embodiments to be described hereinafter in connection with FIGS. 8 to 11.

Figure 8:
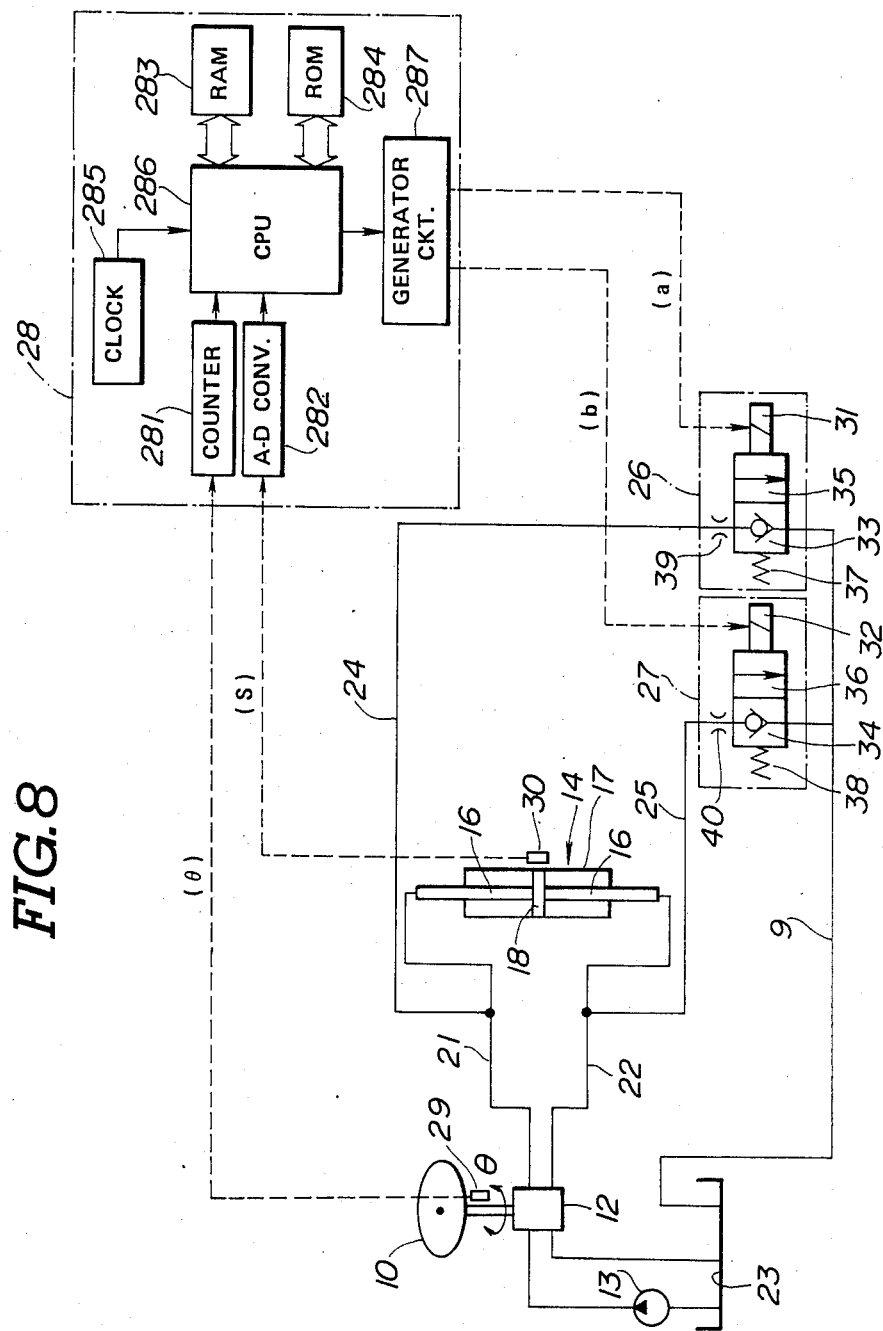
FIG. 8 is a hydraulic circuit diagram showing another embodiment of a full hydraulic power steering system.
Figure 9:
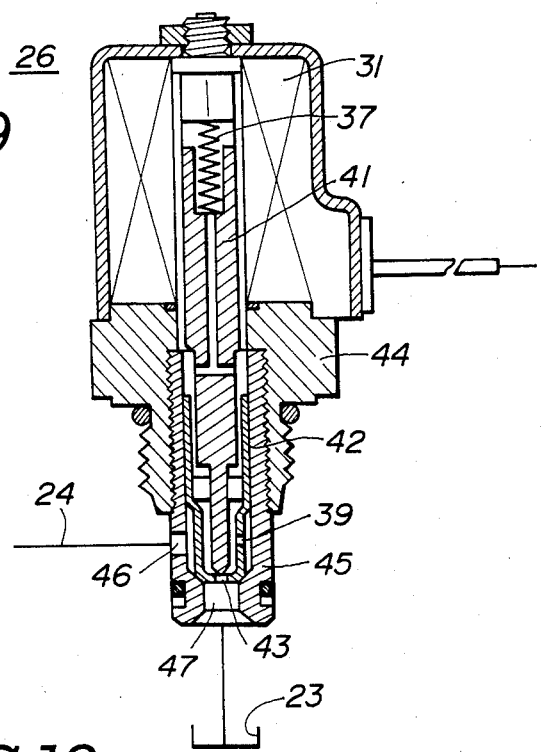
FIG. 9 is a sectional view of a typical structural example of electromagnetic change-over valves used in the system shown in FIG. 8.

Referring to FIG. 8, the full hydraulic control system illustrated is substantially the same as one illustrated in FIG. 7 except the use of an electromagnetic change-over valve 26 as best seen in FIG. 9 and an electromagnetic change-over valve 27 instead of their counterparts in FIG. 7.

As diagramatically shown in FIG. 8, the electromagnetic change-over valves 26 and 27 illustrated herein have one-way valve function providing positions 33 and 34, respectively, and drain function providing positions 35 and 36, respectively. They also have solenoids 31 and 32, and springs 37 and 38 for effecting a shift in positions, and orifices 39 and 40 provided in the drain fluid lines 24 and 25, respectively.

The electromagnetic valves 26 and 27 are quite the same in construction. Describing the construction in detail referring to FIG. 9, the electromagnetic valve 26 is provided with a solenoid 31, a spring 37, a movable spool 41, a sleeve 42, an orifice 39 formed through the sleeve 37, a one-way valve port 43, a valve frame 44, a port frame 45, an inlet port 46, and an outlet port 47. Connected to the inlet port 46 is the drain fluid line 24 from the hydraulic fluid line 21, while connected to the outlet port 47 is a drain line 9 leading to a hydraulic fluid tank 23.

When the solenoid 31 is not energized, the movable spool 41 is biased by the spring 37 assumes a position illustrated in FIG. 9 where a leading end of the movable spool 41 closes the one-way valve port 43, thus allowing one-way flow of hydraulic fluid from the outlet port 47 to the inlet port 46 via the orifice 39 (the one-way valve function providing position 33). When the solenoid 31 is energized, the movable spool 41 is lifted against the spring 37, thus allowing fluid flow communication between the inlet port 46 and the outlet port 47 via the orifice 39 (drain function providing position 35).

Figure 10:
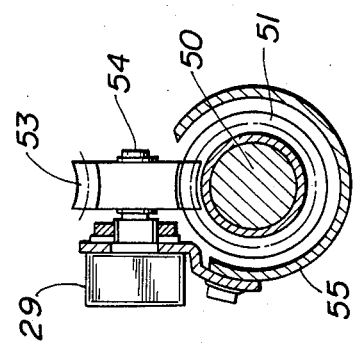
FIG. 10 is a cross sectional view of a steering wheel shaft installed with a steering wheel angle sensor.
Figure 11:
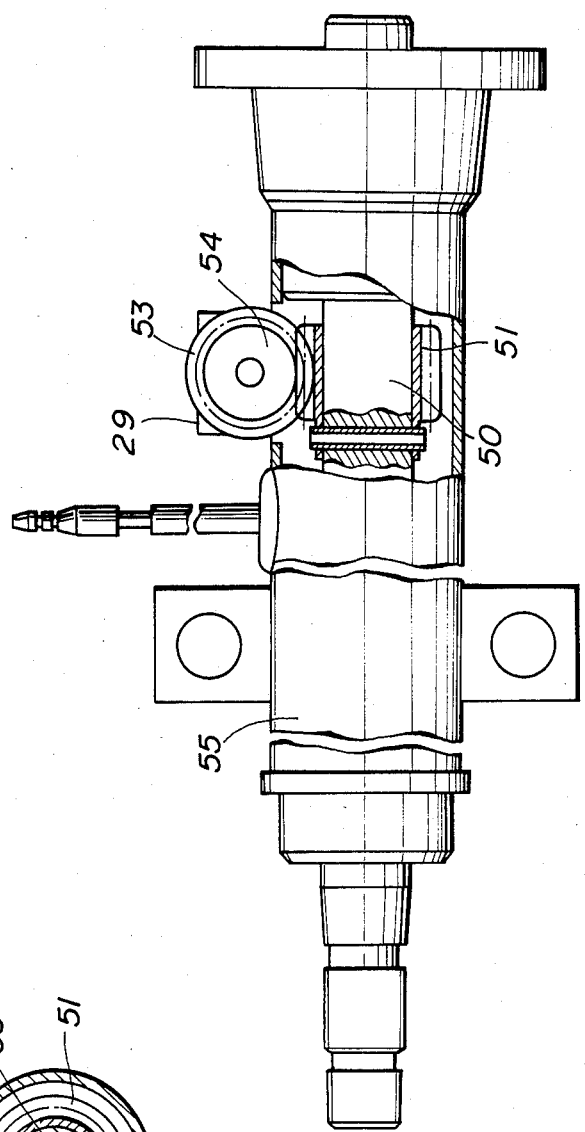
FIG. 11 is a plan view of a steering column assembly partly broken away to show an end view of the steering wheel angle sensor.

The construction of a steering wheel angle sensor 29 is described referring to FIGS. 10 and 11. Reference numeral 50 is a steering shaft of a steering wheel 10. Fixedly connected to the steering shaft 50 is a worm 51 that is in mesh with a worm wheel 53 fixedly mounted to a shaft 54 of the steering wheel angle sensor 29. The steering wheel sensor 29 is fixedly mounted on a steering column 55. When, in operation, turning the steering shaft 50 causes the shaft 54 to rotate at a speed reduced by the worm 51 and the worm wheel 53. This rotation of the shaft 54 is converted by the steering wheel angle sensor 29 into an electric signal and this electric signal is generated as an output indicative of the steering wheel angle.

A control unit 28 illustrated in FIG. 8 carries out a series of operations as illustrated, by the flow chart shown in FIG. 5. When a correction of the position of the steering wheel 10 is made, the hydraulic fluid is discharged from the appropriate one of the hydraulic fluid lines 21 and 22 via the corresponding one of the drain lines 24 and 25 via the corresponding one of the orifices 39 and 40. Thus the discharge rate of the hydraulic fluid is restricted by the corresponding one of the orifices 39 and 40, thus preventing a rapid drop in pressure within the steering cylinder 14. Since this state may be regarded as adom pressurized hydraulic fluid into a branch leading to drain, the drainage the transmission of pressure from the steering unit 12 to the steering cylinder 14 is not interrupted so that the steering cylinder 14 can hold its position even if an external force applied to the steered wheel 103 is transmitted to the steering cylinder 14. Since, in this manner, the steered wheel 103 is kept in its steered direction during the operation to correct the position of the steering wheel 10, the stability of the vehicle during the steering is enhanced.

Consider now that an excessive external force is applied to the steering cylinder from the steered wheel 103 during the operation to of connecting the position of the steering wheel 10, causing the cylinder 17 to be displaced to increase the volume of that chamber 17a or 17b which is connected with the hydraulic fluid line that is not drained. This volume increase tends to create a bubble that prevents transmission of pressure. This tendency to create a bubble is eliminated by the provision of one-way valve function providing positions 33 and 34 of the electromagnetic valves 26 and 27 because, when such volume increase takes place, the hydraulic fluid is supplied from the drain line 9 to that chamber within the steering cylinder 14 which is subject to such volume increase via the corresponding drain line 24 or 25 and the corresponding hydraulic fluid line 21 or 22.

Figure 13:
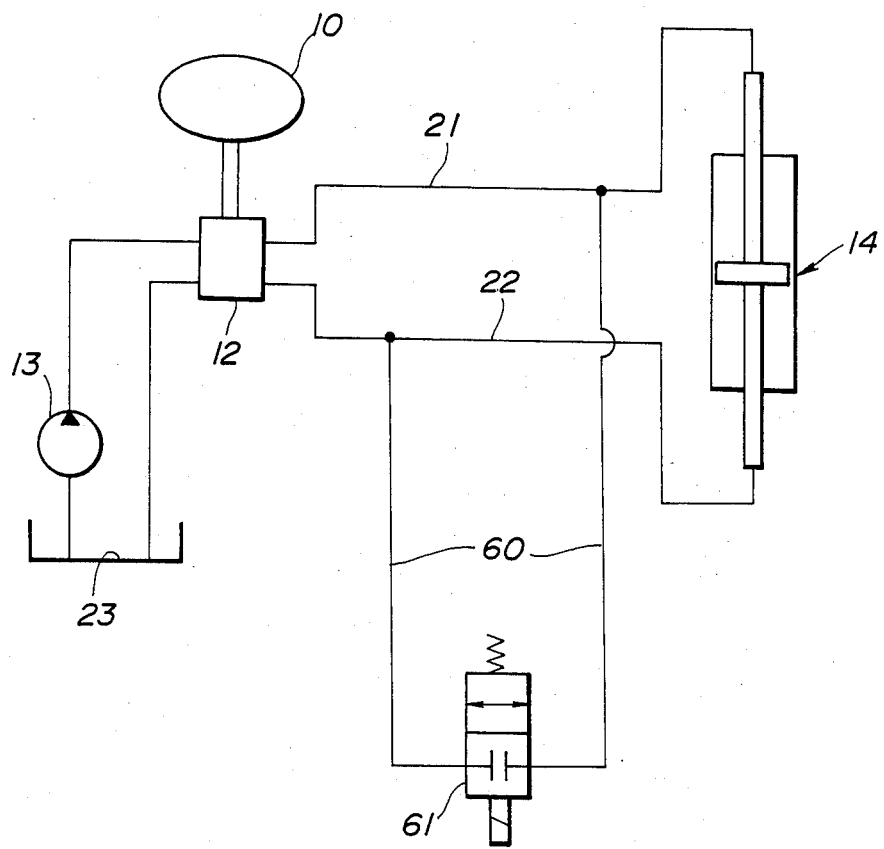
FIG. 13 is a simplified hydraulic circuit diagram showing a residual pressure maintaining structure.

Referring to FIG. 13, there is shown a simplified diagram of a still another embodiment of a full hydraulic power steering system. This embodiment is substantially the same as the embodiment shown in FIG. 8 except th at the drain lines 24 and 25 and two electromagnetic valves 26 and 27 have been replaced with a connecting line 60 interconnecting two hydraulic fluid lines 21 and 22 and a single electromagnetic change-over valve 61 disposed in the connecting line 60. When a solenoid associated therewith is not energized, the electromagnetic valve 61 assumes a position illustrated where the fluid communication through the connecing line 60 is blocked, while when the associated solenoid is energized, the electromagnetic valve 61 assumes another position where the fluid communication through the connecting line 60 is permitted. Although in this embodiment, the single electromagnetic change-over valve 61 having one solenoid is used, a series of operations carried out by a control unit, not shown, is substantially the same. the series of operations illustrated by the flow chart shown in FIG. 5.

Figure 14:
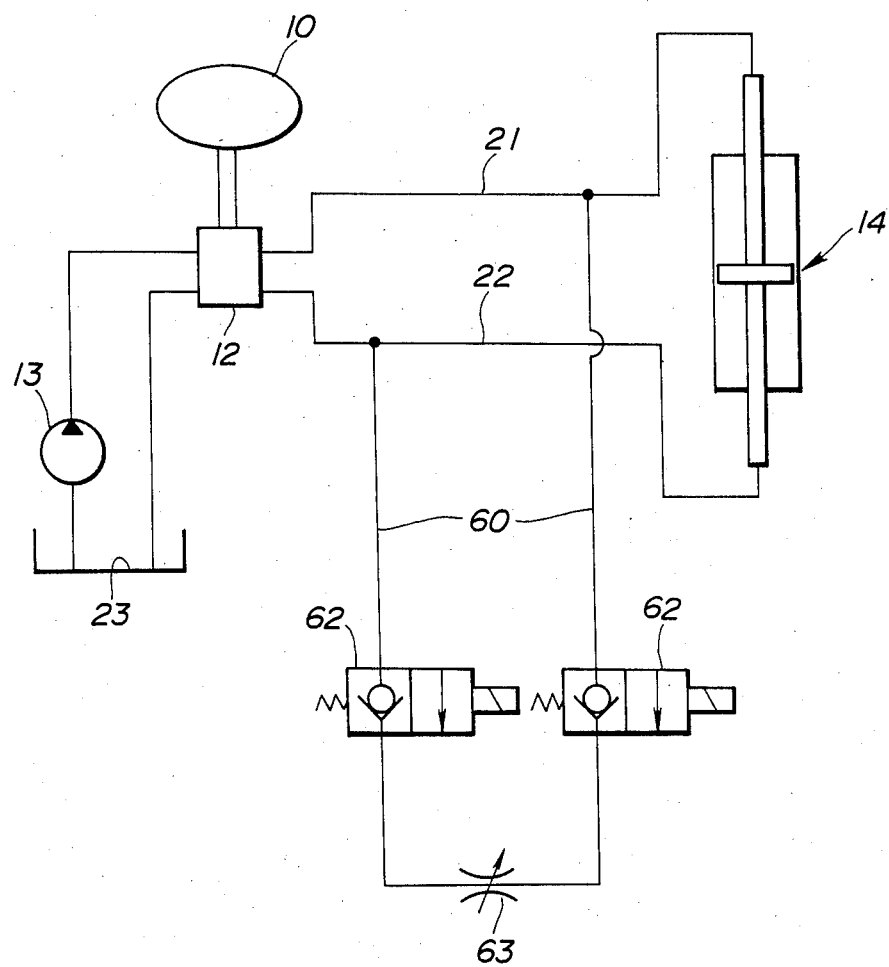
FIG. 14 is a circuit diagram showing another form of residual pressure maintaining structure

Referring to FIG. 14, this embodiment is substantially the same as the embodiment shown in FIG. 13 except, that instead of the single electromagnetic valve 61, two electromagnetic valves 62 and 62 are disposed in a connecting line 60 and a variable orifice 63 is disposed between these electromagnetic valves.

In the embodiments shown in FIGS. 13 and 14, the hydraulic fluid lines 21 and 22 are allowed to communicate with each other via the connecting line 60 during the operation to correct the position of the steering wheel 10, allowing the discharge of hydraulic fluid through the connecting line 60 to the tank 23. Since the pressure in the hydraulic fluid line 21 and that in the other hydraulic fluid line 22 become substantially the same pressure level, there remains fluid pressure within that one of the hydraulic fluid lines which is to be drained during the operation to correct the position of the steering wheel 10. In the embodiment shown in FIG. 14, the variable orifice 63 is provided to increase the function of causing the pressure to remain.

Figure 15:
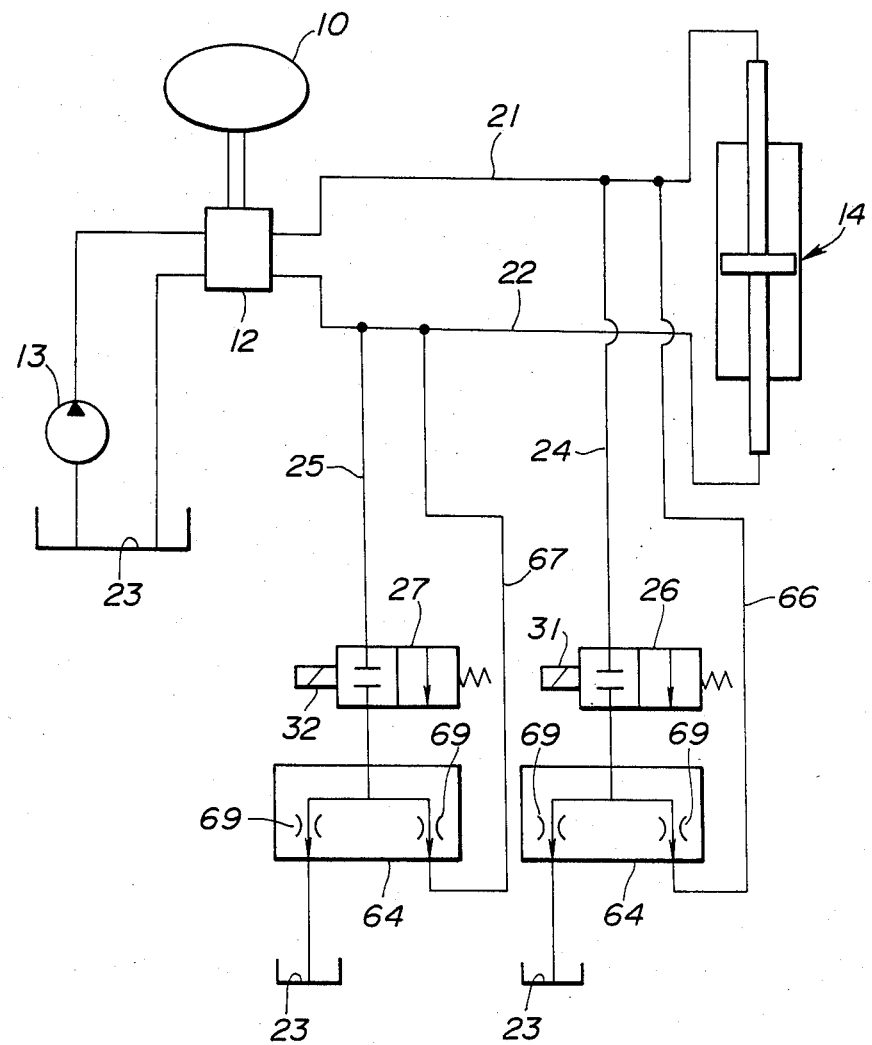
FIG. 15 is a circuit diagram showing still another form of residual pressure maintaining structure.
Figure 16:
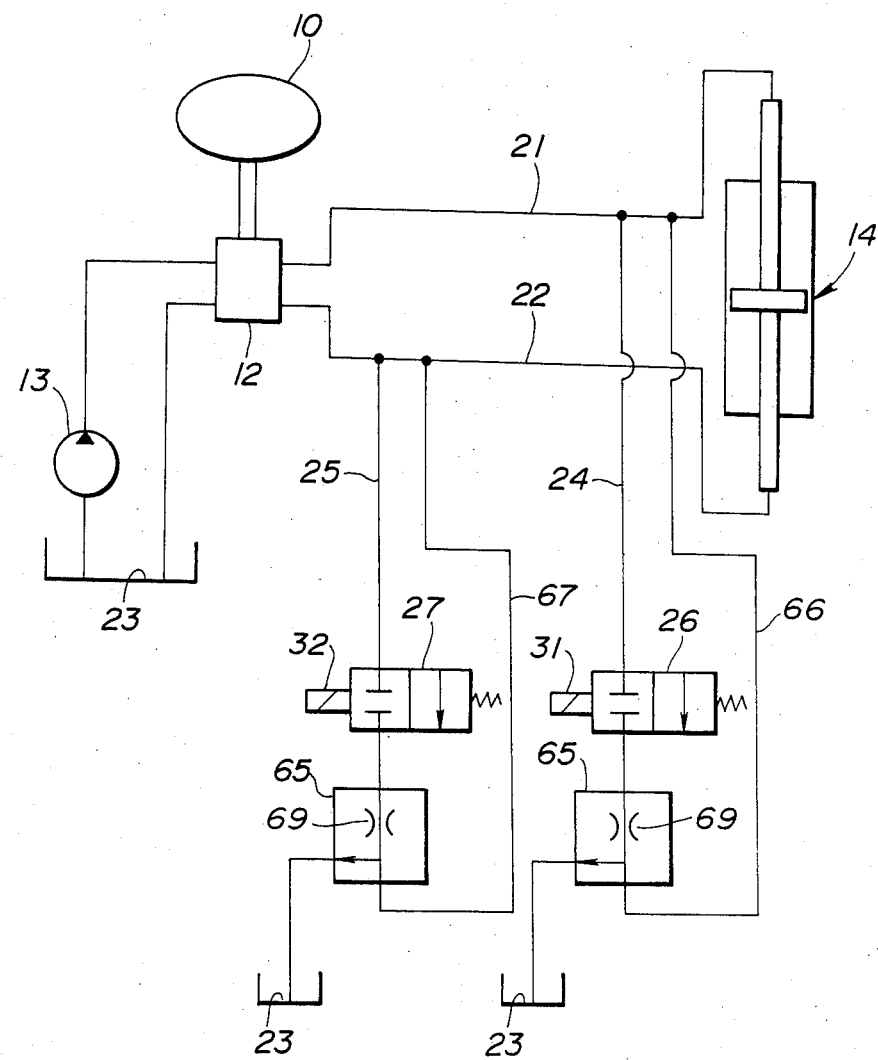
FIG. 16 is a circuit diagram showing a still another form of residual pressure maintaining structure.

Referring to FIGS. 15 and 16, the two embodiments are diagrammatically illustrated. These embodiments are substantially the same as the embodiment illustrated in FIG. 7 in that two electromagnetic valves 26 and 27 are disposed in drain fluid lines 24 and 25, respectively. They are, however, different from the embodiment illustrated in FIG. 7 in that there is disposed downstream of each of the electromagnetic valves 26 and 27 a separate valve 64 (see FIG. 15) or 65 (see FIG. 16), i.e., a valve separating a fluid flow input into two fluid flow outputs, such that one fluid flow output is connected to a hydraulic fluid tank 23 and the other fluid flow output is connected via a return fluid line 66 or 67 to the corresponding one of hydraulic fluid lines 21 and 22, as illustrated in FIG. 15 or 16. In the embodiment shown in FIG. 15, each of the separate valves 64 has orifices 69 provided to restrict hydraulic fluid flow outlets, respectively. In the embodiment shown in FIG. 16, each of the separate valve 65 has a single orifice 69 provided to restrict hydraulic fluid flow outlets.

According to the embodiments shown in FIGS. 15 and 16, a portion of all of the hydraulic flujid to be discharged during operation of correcting the position of the steering wheel 10 is allowed to flow into the tank 23, while the remaining amount of hydraulic fluid is returned via one of the return fluid lines to the hydraulic fluid line. This prevents a rapid drop in pressure, thus allowing the pressure to remain in the steering cylinder 14 during the operation of correcting the position of the steering wheel 10.

Figure 17:
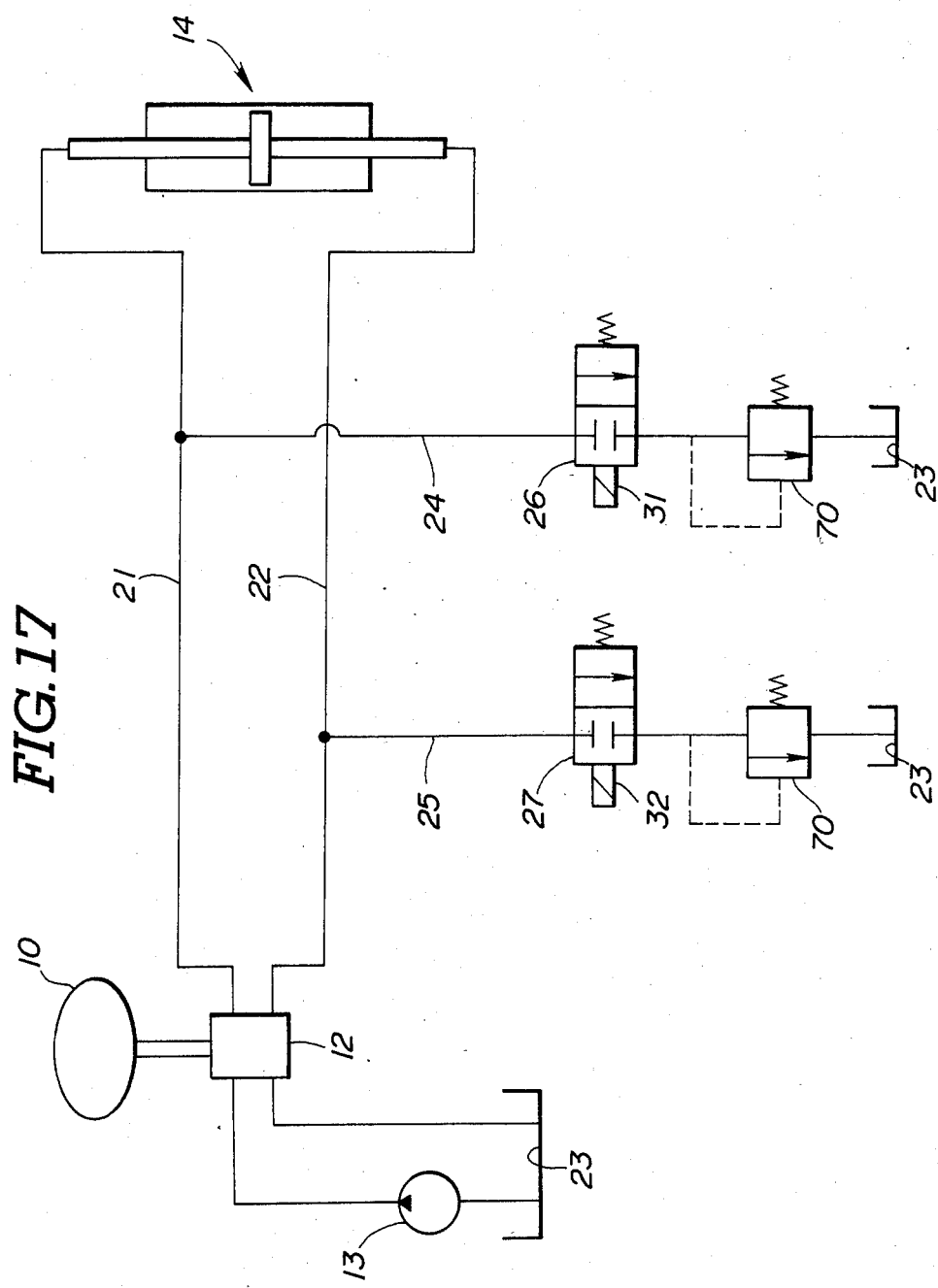
FIG. 17 is a circuit diagram shown still another form of residual pressure maintaining structure.

Referring to FIG. 17, this embodiment is similar to the embodiment shown in FIG. 16 except that instead of two separate valves 65 and 65, two pressure relief valves 70 and 70 are disposed downstream of electromagnetic change-over valves 26 and 27, respectively. Each relief valve 70 works to allow passage of fluid flow therethrough toward a hydraulic fluid tank 23 only when pressure is higher than a predetermined value, and thus no fluid is allowed to be discharged toward the tank 23 until the pressure reaches the predetermined value.

Thus, according to this embodiment, even if the hydraulic fluid is discharged from one of the electromagnetic change-over valves 26 and 27 during operation of correction the position of the steering wheel 10, the hydraulic fluid discharged from the electromagnetic change-over valve is not allowed to flow into the tank 23 until the pressure exceeds the predetermined value. Thus, the pressure within the hydraulic fluid line 21 or 22 that allows the fluid discharge is kept at the predetermined value set by the relief valve 70.

Figure 18:
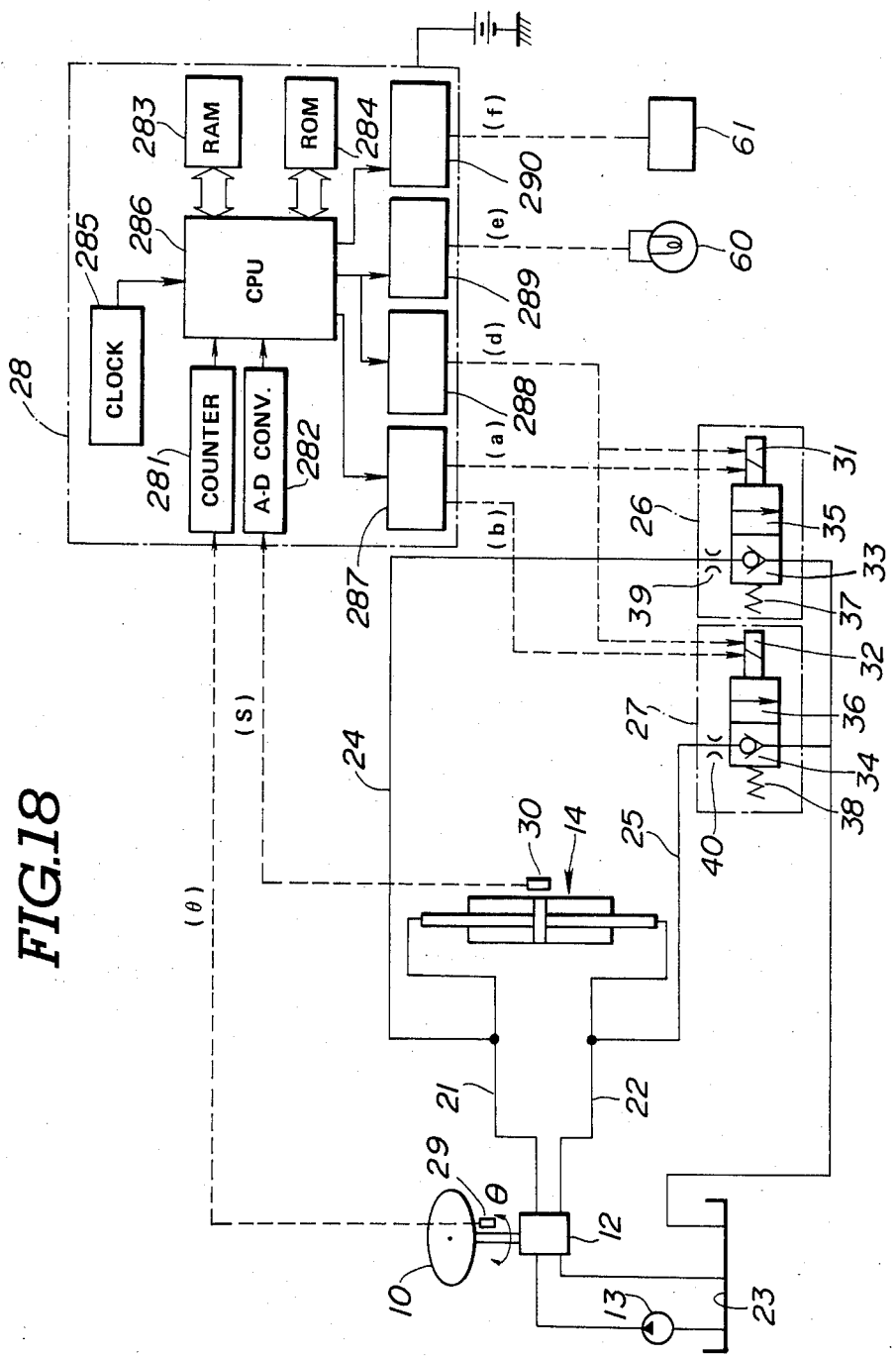
FIG. 18 is a hydraulic circuit diagram of a last embodiment of a full hydraulic power steering system.
Figure 19:
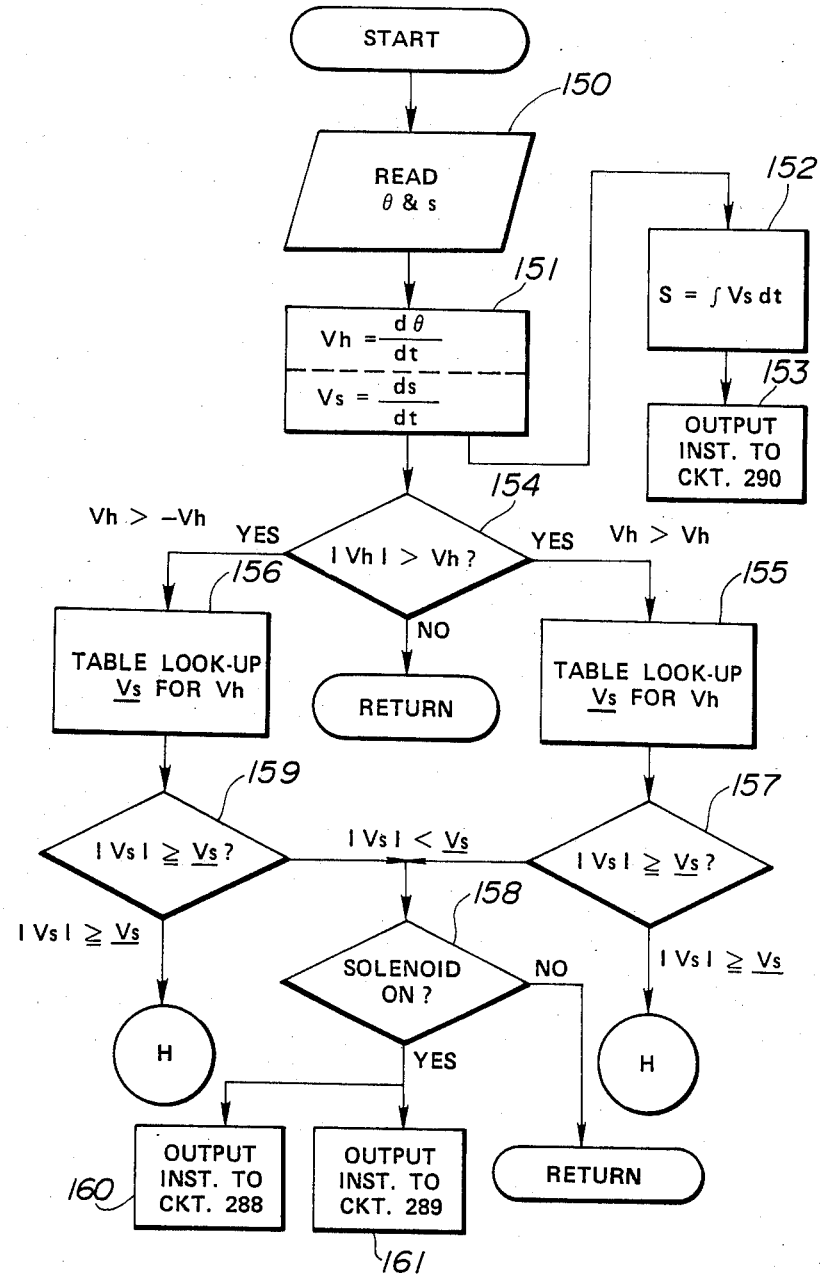
FIGS. 19 and 20 show a flow chart showing a sequence of operations carried out in a control unit shown in FIG. 18.
Figure 20:
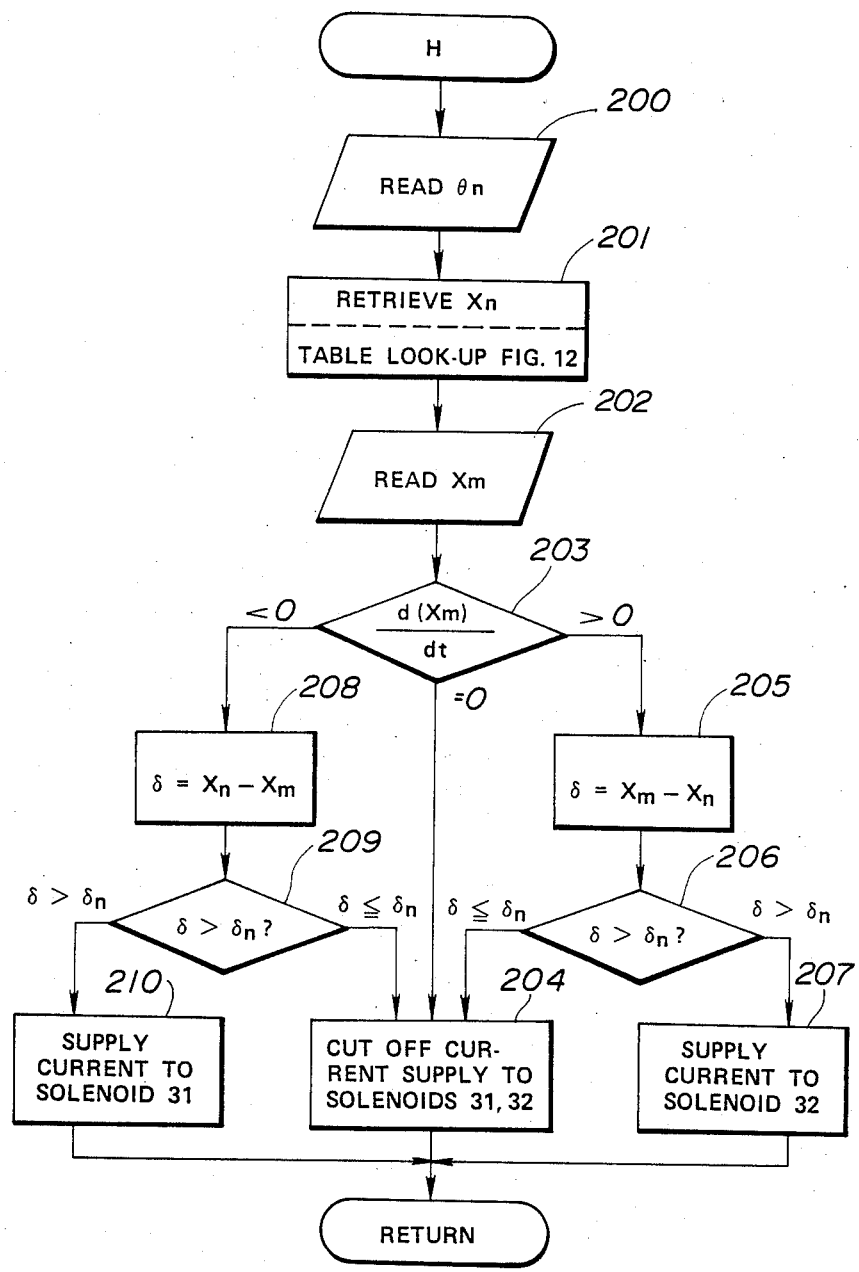

Referring to FIGS. 18 to 20, there is described an embodiment of a full hydraulic power steering which normally effects a correction control of the position of a steering wheel 10, but suspends such correction control in case of trouble taking place in the power steering system.

Referring to FIG. 18, the power steering system illustrated therein is substantially the same as that shown in FIG. 8 except that a control unit 28 shown in FIG. 18 generates a control suspension signal d which overrides control signals a and b when a steering wheel angle velocity Vh determined by calculation using a steering wheel angle signal θ (theta) and a cylinder stroke velocity Vs determined by calculation using a cylinder stroke signal s. The control unit 28 also generates a signal e while the control suspension signal d is being generated. In response to this signal e, an alarm is activated to give an alarm signal. What is also done in the control unit 28 includes a calculation to determine a cylinder stroke signal f by using the cylinder stroke velocity signal Vs.

Describing in detail, the control unit 28 shown in FIG. 18 also includes a control suspension signal generator circuit 288, an alarm signal generator circuit 289 and a steered angle display signal generator circuit 290. The control suspension signal generator circuit 288 generates and supplies the control suspension signal d to solenoid 31 and 32 in response to the result of operation by CPU 286. This signal d causes the solenoids 31 and 32 to shift to OFF if they are ON and causes the solenoids 31 and 32 to maintain OFF if they are OFF. The alarm signal generator circuit 289 is responsive to the presence of the same result of operation and generates and supplies the alram signal e to the alarm lamp 60 causing same to generate an alarm. The steered angle display signal generator circuit 290 generates in response to the result of operation in the CPU 286 an angle display signal f to be supplied to the steered angle display 61.

The operation of this embodiment is hereinafter.

Referring to FIG. 19, there is shown a flow chart illustrating a series of operations carried out by the CPU of the control unit 28 in checking out the system.

First of all, a step 150 is executed to read a steering wheel angle signal θ (theta) from the steering wheel angle sensor 29 and also a cylinder stroke signal s from a cylinder position sensor 30.

Then, a step 151 is executed to perform arithmetic operation based on the signals obtained in the step 150 to determine a steering wheel angle valocity Vh and a cylinder stroke velocity Vs. What are performed in this step 151 are operations to give first derivative with respect to time of θ (theta) and s which may be expressed as $Vh = d\theta/dt$ and $Vs = ds/dt$.

A step 152 is executed to perform arithmetic operation using the cylinder stroke velocity Vs to give a cylinder stroke amount S by integrating Vs with respect to time, i.e., $S = \int Vs \cdot dt$. Then, a step 153 is executed where an operation result signal corresponding to the cylinder stroke amount S is generated and supplied to the angle display signal generator circuit 290. As a result, the steered angle is displayed by the display device 61 to inform an operator.

After execution of the step 151, a step 154 is executed where the absolute valve |Vh| of the steering wheel angle velocity Vh with a reference value $\overline{Vh}$. If it is less than or equal to the reference value $\overline{Vh}$, the operation returns to START, while if it is greater than the reference value $\overline{Vh}$, a next step 155 or 156 is executed. This step 154 is provided based on the consideration that if the steering wheel angle valocity Vh is small, it cannot be used as a decision reference because it may be greatly affcted by malfunction or trouble of the sensor.

If Vh is greater than $\overline{Vh}$, a step 155 is executed where a normal limit value $\overline{Vs}$ in cylinder stroke valocity Vs for the steering wheel angle velocity Vh obtained in the step 151 is given by look-up table stored in the ROM 284. The normal limit value $\overline{Vs}$ is a value set after measuring a cylinder stroke velocity Vs for a steering wheel angle velocity Vh under normal condition where there is no leak in hydraulic fluid, and taking into account an error which may be caused by steering resistance due to road surface condition.

Then, a step 157 is executed where the absolute value |Vs| of the actual cylinder stroke velocity Vs is compared with the normal limit value $\overline{Vs}$ obtained in the step 155. If |Vs| is greater than or equal to Vs, it is decided that the system is normal and a correction control of the position of a steering wheel is carried out along with a series of operations illustrated by a flow chart shown in FIG. 20. If |Vs| is less than $\overline{Vs}$, it is decided that the system is in trouble and the operation proceeds to a step 158. In the case where Vn is greater than −Vh as a result of the comparison in the step 154. step 156 and then a step 159 are executed wherein similar operations to the operations in steps 155 and 157 are carried out.

At the step 158, a decision is made whether solenoids 31 and 32 are ON. If the solenoid 31 and 32 are OFF, this state of the solenoid is maintained and the operation returns to START. If at least one of the solenoids 31 and 32 is ON, an instruction signal is supplied to the control suspension signal generator circuit 288 so as to cause it to generate a signal rendering the solenoid OFF at a step 160, and a signal is supplied to alarm signal generator circuit 289 to cause the alarm lamp 60 to produce a warning light at a step 161.

In the above mentioned manner, when the relationship between the steering wheel angle velocity Vh and the cylinder stroke valocity Vs attains a predetermined relationship indicating that the system is in trouble, the control suspension signal d is generated to suspend the action of means for discharging the hydraulic fluid. At the same time, an alarm lamp 60 is turned on to inform the operator that the system is in trouble.

The series of operations illustrated in the flow chart shown in FIG. 20 are quite the same as that illustrated in the flow chart shown in FIG. 5. Thus description of this flow chart is omitted.

Although, in each of the embodiments described, two hydraulic fluid lines 21 and 22 are connected to drain lines, respectively, so as to allow discharge of hydraulic fluid therefrom, it is possible to connect only one of the hydraulic fluid lines to a single drain line so as to correct the position of steering wheel by effecting drain through this single drain line only when the steering wheel turns in one of the two directions.

In the case of the embodiment illustrated in FIGS. 2 and 3, a parking brake may be operatively connected via a suitable mechanism with the manual change-over valve 5A so that the change-over valve will not be actuated except when the parking brake is applied as a safety measure.

Although, in each of the embodiments except the first embodiment shown in FIGS. 2 and 3, a cylinder stroke of a steering cylinder 14 is measured to indirectly detect a steered wheel angle of the steered wheel 103, a sensor may be provided for directly detecting the steered angle of the steered wheel 103. Although, in each of these embodiments, each of the electromagnetic valves is controlled in ON/OFF manner, it may be duty factor controlled.

Although a steering cylinder of a linear motion type is used as a steering actuator in each of the embodiments, other types of actuators may be used.

In the last embodiment illustrated in FIGS. 18 to 20, the steering wheel angle velocity and cylinder stroke velocity are used to judge whether the system is normal or in trouble, but it is possible to make such judgement by using the steering wheel angle and the cylinder stroke angle such that one of them is used as a reference. Warning means include a device to produce a warning sound except the warning lamp. If desired it is possible to employ measure to apply brake when it is decided that the system is in trouble. If a circuit to check the input signals is provided, it may add a function to render the actuator inoperative when it is decided the input signals are abnormal.

What is claimed is:

1. A full hydraulic power steering system for a vehicle having a steered wheel, comprising:

a tank containing hydraulic fluid;

a pump communicating with said tank for discharging the hydraulic fluid under pressure;

a hydraulic actuator including a stationary part fixed to the vehicle and a movable part movable relative to said stationary part and drivingly connected to the steered wheel, said stationary part cooperating with said movable part to define a first chamber and a second chamber, said movable part being movable in response to hydraulic fluid pressures created within said first and second chambers;

a steering wheel;

a steering unit operable by said steering wheel;

hydraulic fluid line means operatively interconnecting said steering unit and said hydraulic actuator, said hydraulic fluid line means including a first hydraulic fluid line having one end connected to said steering unit and an opposite end communicating with said first chamber, and a second hydraulic fluid line having one end connected to said steering unit and an opposite end communicating with said second chamber;

said steering unit being constructed and arranged such that it allows supply of the hydraulic fluid discharged under pressure by said pump to one of said first and second hydraulic fluid lines and discharge of hydraulic fluid from the other of said first and second hydraulic fluid lines;

means connected to portions of said first and second hydraulic fluid lines for allowing discharge of hydraulic fluid flow from said portion of selected one of said first and second hydraulic fluid lines to cause a drop in hydraulic fluid pressure within said selected one hydraulic fluid line, while preventing discharge of hydraulic fluid from said portion of the other of said first and second hydraulic fluid lines:

said discharge allowing means including valve means for normally preventing said discharge of hydraulic fluid, said valve being operable for selecting one of said first and second hydraulic fluid lines from which said discharge of hydraulic fluid is allowed and means for operating said valve means.

2. A full hydraulic power steering system as claimed in claim 1, wherein said operating means includes a manually operable control member.

3. A full hydraulic power steering system as claimed in claim 1, wherein said valve means includes an electromagnetic change-over valve having a solenoid, and said operating means includes first sensor means for detecting a steering wheel angle of said steering wheel and generating a first sensor signal indicative of the steering wheel angle detected, second sensor means for detecting a steered angle of the steered wheel and generating a second sensor signal indicative of the steered angle detected, means responsive to said first and second sensor signals for controlling said solenoid.

4. A full hydraulic power steering system as claimed in claim 3, wherein said controlling means includes a portion having stored therein retrievable data containing target values in steered angle, each against one value in steering wheel angle.

5. A full hydraulic power steering system as claimed in claim 3, wherein said controlling means includes a portion where a control suspension signal is generated to render said valve means inoperable when said first and second sensor signals attained a predetermined relationship that indicate that the system fails to work normally.

6. A full hydraulic power steering system as claimed in claim 4, wherein said controlling means includes a second portion where a target value in steered angle is retrieved for an actual value in steering wheel angle indicated by said first sensor signal, and said target value in steered angle is compared with an actual value in steered angle that is indicated by said second sensor signal, and a signal is generated which causes energization of said solenoid which in turn renders said valve means operable when said result of comparison indicates a predetermined relationship.

7. A full hydraulic power steering system as claimed in claim 6, wherein said predetermined relationship is accomplished when said actual value in steered angle deviates from said target value in steered angle in one direction by a predetermined value.

8. A full hydraulic power steering system as claimed in claim 6, wherein a ratio of a target value in steered angle to a corresponding value in steering wheel angle within said data stored in smaller than a ratio of an ideal value in steered angle to said corresponding value in steering wheel angle.

9. A full hydraulic power steering system as claimed in claim 1, wherein said valve means includes a flow restrictor provided to restrict the rate of hydraulic fluid flow passing through said passing discharge allowing means.

10. A full hydraulic power steering system as claimed in claim 9, wherein said valve means includes one-way means for allowing hydraulic fluid to flow into said the other one of said first and second hydraulic fluid lines.

11. A full hydraulic power steering system as claimed in claim 1, wherein said hydraulic fluid line means has said first hydraulic fluid line and second hydraulic fluid line connected in parallel between said steering unit and said hydraulic actuator.

12. A full hydraulic power steering system as claimed in claim 11, wherein said hydraulic fluid flow passaing means having one end connected to said first hydraulic fluid line and an opposite end connected to said second hydraulic fluid line.

13. A full hydraulic power steering system as claimed in claim 12, wherein said valve means comprises a variable flow restirctor provided to restrict hydraulic fluid flow passing through said discharge allowing means.

14. A full hydraulic power steering system as claimed in claim 1, further comprising means for returning a portion of hydraulic fluid flow passing through said passing means back to portion of said hydraulic fluid line means.

15. A full hydraulic power steering system as claimed in claim 1, further comprising a relief valve means, for keeping fluid pressure within said discharge allowing means at a predetermined value.

16. A method of correcting the position of a steering wheel of a vehicle in relation to an associated hydraulic actuator for a steered wheel within a full hydraulic power steering system, the hydraulic actuator including a stationary part fixed to the vehicle and a movable part movable relative to the stationary part and drivingly connected to the steered wheel, the stationary part cooperating with the movable part to define a first chamber and a second chamber, the movable part being movable in response to hydraulic fluid pressures created within the first and second chambers, the full hydraulic power steering system further comprising a steering unit operable by the steering wheel, a first hydraulic fluid line having one end connected to the steering unit and an opposite end communicating with the first chamber, and a second hydraulic fluid line having one end connected to the steering unit and an opposite end communicating with the second chamber:

detecting a steering wheel angle of the steering wheel and generating a first signal indicative of the steering wheel angle detected;

detecting a steered angle of the steered wheel and generating a second signal indicative of the steered angle detected;

retrieving a predetermined data table for determining a target steered angle for the steering wheel angle indicated by said first signal and generating a third signal indicative of the target steered angle determined;

comparing said second signal with said third signal;

selecting which one of the first and second hydraulic fluid lines to be subject to the fluid discharge in response to the result of said comparing step;

discharging hydraulic fluid from the one of the first and second hydraulic fluid lines selected by said selecting step to cause a drop in hydraulic fluid pressure within said selected one hydraulic fluid line; and allowing the steering wheel to correct its position while it is being manipulated.

17. In a full hydraulic power steering system for a vehicle having a steered wheel, comprising:

a tank containing hydraulic fluid;

a pump communicating with said tank for discharging the hydraulic fluid under pressure;

a hydraulic actuator including a stationary part fixed to the vehicle and a movable part movable relative to said stationary part and drivingly connected to the steered wheel, said stationary part cooperating with said movable part to define a first chamber and a second chamber, said movable part being movable in response to hydraulic fluid pressures created within said first and second chambers;

a steering wheel;

a steering unit operable by said steering wheel;

a first hydraulic fluid line having one end connected to said steering unit and an opposite end communicating with said first chamber;

a second hydraulic fluid line having one end connected to said steering unit and an opposite end communicating with said second chamber; and said steering unit being constructed and arranged such that it allows supply of the hydraulic fluid discharged under pressure by said pump to one of said first and second hydraulic fluid lines and discharge of hydraulic fluid from the other of said first and second hydraulic fluid lines:

a correction system for eliminating a deviation in position of said steering wheel from a desired position predetermined in relation to operating position of said hydraulic actuator, comprising:

means for allowing discharge of hydraulic fluid from selected one of said first and second hydraulic fluid lines to cause a drop in hydraulic fluid pressure within said selected one hydraulic fluid line, while preventing discharge of hydraulic fluid from the other of said first and second hydraulic fluid lines;

said discharge allowing means including valve means for normally preventing said discharge of hydraulic fluid, said valve being operable for selecting one of said first and second hydraulic fluid lines from which said discharge of hydraulic fluid is allowed; and means operatively coupled with said valve means for permitting said steering wheel to freely move in such a direction as to eliminate said deviation.

18. In a full hydraulic power steering system for a vehicle having a steered wheel, comprising:

a tank containing hydraulic fluid;

a pump communicating with said tank for discharging the hydraulic fluid under pressure;

a hydraulic actuator including a stationary part fixed to the vehicle and a movable part movable relative to said stationary part and drivingly connected to the steered wheel, said stationary part cooperating with said movable part to define a first chamber and a second chamber, said movable part being movable in response to hydraulic fluid pressures created within said first and second chambers;

a steering wheel;

a steering unit operable by said steering wheel;

a first hydraulic fluid line having one end connected to said steering unit and an opposite end communicating with said first chamber;

a second hydraulic fluid line having one end connected to said steering unit and an opposite end communicating with said second chamber; and said steering unit being constructed and arranged such that it allows supply of the hydraulic fluid discharged under pressure by said pump to one of said first and second hydraulic fluid lines and discharge of hydraulic fluid from the other of said first and second hydraulic fluid lines:

a correction system for eliminating a deviation in position of said steering wheel from a desired position predetermined in relation to operating position of said hydraulic actuator, comprising:

means for detecting a steering wheel angle of the steering wheel and generating a first signal indicative of the steering wheel angle detected;

means for detecting a steered angle of said steered wheel and generating a second signal indicative of the steered angle detected;

means for determining a target steered angle for the steering wheel angle indicated by said first signal and generating a third signal indicative of the target steered angle determined;

means for comparing said second signal with said third signal and generating a result indicative signal;

means for allowing discharge of hydraulic fluid from selected one of said first and second hydraulic fluid lines to cause a drop in hydraulic fluid pressure within said selected one hydraulic fluid line, while preventing discharge of hydraulic fluid from the other of said first and second hydraulic fluid lines; said discharge allowing means including valve means for normally preventing said discharge of hydraulic fluid, said valve being operable for selecting one of said first and second hydraulic fluid lines from which said discharge of hydraulic fluid is allowed; and means for operating said valve means in response to said result indicative signal, whereby said steering wheel is permitted to freely move in such a direction as to eliminate said deviation.

* * * * *